United States Patent
Lin et al.

(10) Patent No.: US 9,674,024 B2
(45) Date of Patent: Jun. 6, 2017

(54) METHOD FOR TRANSMITTING A SIGNAL WITH A PREAMBLE AND CORRESPONDING DEVICES, SIGNAL WITH CORRESPONDING PREAMBLE FOR SYNCHRONIZATION OF A RECEIVER

(71) Applicant: ORANGE, Paris (FR)

(72) Inventors: Hao Lin, Rennes (FR); Pierre Siohan, Rennes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/307,802

(22) PCT Filed: May 20, 2015

(86) PCT No.: PCT/FR2015/051330
§ 371 (c)(1),
(2) Date: Oct. 28, 2016

(87) PCT Pub. No.: WO2015/177468
PCT Pub. Date: Nov. 26, 2015

(65) Prior Publication Data
US 2017/0054586 A1    Feb. 23, 2017

(30) Foreign Application Priority Data
May 21, 2014  (FR) .................................. 14 54555

(51) Int. Cl.
*H04L 27/26*   (2006.01)
*H04L 27/14*   (2006.01)

(52) U.S. Cl.
CPC ...... *H04L 27/2692* (2013.01); *H04L 27/2671* (2013.01); *H04L 27/2675* (2013.01); *H04L 27/2613* (2013.01); *H04L 27/2698* (2013.01)

(58) Field of Classification Search
CPC ............ H04L 27/2675; H04L 27/2671; H04L 27/2692; H04L 27/2698; H04L 27/2613
See application file for complete search history.

(56) References Cited

FOREIGN PATENT DOCUMENTS

| FR | 2995749 A1 | 9/2012 |
|---|---|---|
| WO | WO 2013/001243 A1 | 1/2013 |

OTHER PUBLICATIONS

Tilde Fusco, Angelo Petrella, and Mario Tanda, "A Data-Aided Symbol Timing Estimation Algorithm for OFDM/OQAM Systems", in Proc. Intern. Conf. on Communications (ICC), Dresden, Germany, 2009, pp. 1-5.

(Continued)

*Primary Examiner* — Michelle M Koeth
(74) *Attorney, Agent, or Firm* — Haverstock & Owens LLP

(57) ABSTRACT

The invention relates to a method of transmitting a signal comprising successive multi-carrier symbols with M subcarriers arranged in a frame, defined by a preamble comprising a first multi-carrier symbol:

$$P_0[k] = \sum_{m=0}^{M-1} p_{m,0} g[k] e^{j\frac{2\pi}{M}m(k-\frac{D}{2})} e^{j\frac{\pi m}{2}}$$

and a second multi-carrier symbol:

$$P_1[k] = \sum_{m=0}^{M-1} p_{m,1} g[\mathrm{mod}(k-N, M)] e^{j\frac{2\pi}{M}m(k-\frac{D}{2})} e^{j\frac{\pi(m+1)}{2}}.$$

(Continued)

The pilot symbols $p_{m,0}$ are such that:

$$p_{m,0} = \begin{cases} \alpha_m, & m \text{ even} \\ 0, & m \text{ odd} \end{cases}$$

and $$p_{m,1} = \begin{cases} p_{m,0}(-j), & m \text{ even} \\ 0, & m \text{ odd} \end{cases}$$

with $\alpha_m$ a real random variable.

4 Claims, 2 Drawing Sheets

(56) References Cited

OTHER PUBLICATIONS

International Search Report for PCT/FR2015/051330.

METHOD FOR TRANSMITTING A SIGNAL WITH A PREAMBLE AND CORRESPONDING DEVICES, SIGNAL WITH CORRESPONDING PREAMBLE FOR SYNCHRONIZATION OF A RECEIVER

FIELD OF THE INVENTION

The field of the invention is that of transmitting digital signals between a transmitter and a receiver, the signals being transmitted in a certain format, and more particularly the field of the invention is that of synchronizing the receiver of such a signal.

The invention finds applications particularly, but not exclusively, in the field of telecommunications with an over-the-air or radio type transmission channel. The channel could equally well be a channel of the power line telecommunication (PLT) type or of the optical fiber type. An optical fiber type channel is dispersive. A PLT type channel leads to effects that are similar to those encountered in a radio channel. In particular, like a radio channel, a PLT channel may lead to multiple paths during transmission.

The transmitted signal is a multi-carrier signal prepared from a succession of multi-carrier symbols, themselves constructed as a result of mapping complex symbols belonging to a constellation on the various carriers.

Orthogonal frequency division multiplexing (OFDM) is a multi-carrier modulation technique that imposes an orthogonality constraint between the subcarriers in order to limit interference between the carriers (also known as intercarrier interference (ICI)) while also optimizing spectrum occupancy. OFDM also benefits from implementation schemes that are simple and effective, being based on fast Fourier transforms, inverse fast Fourier transforms (IFFT) on transmission and (forward) fast Fourier transforms (FTT) on reception.

The orthogonality constraint between the subcarriers is provided by using a rectangular function (Π gate function) for shaping the multi-carrier signal. Furthermore, adding redundancy in the form of a cyclic prefix (CP) or in the form of a guard interval (e.g. made up of zeros) at the outlet from the inverse fast Fourier transform serves to limit distortion due to interference introduced by the channel both between the symbols (also known as inter-symbol interference (ISI)) and between the carriers.

The expression for an OFDM signal with a cyclic prefix (CP-OFDM signal) in baseband and in discrete time $s_{CP\text{-}OFDM}[k]$ for M subcarriers, at an instant k (Te=1/Fe), and for a normalized sampling frequency (Fe) equal to 1, is given by the following equation:

$$s_{CP\text{-}OFDM}[k] = \sum_{m=0}^{M-1} \sum_{n=-\infty}^{+\infty} c_{m,n} \prod [k-n(M+L_{CP})]e^{j\frac{2\pi}{M}mk}$$

where $j^2=-1$, Π designates a gate function of duration M, $c_{m,n}$ is a complex symbol (e.g. a quadrature amplitude modulation (QAM) symbol) transmitted on the carrier m at the instant n, and $L_{CP}$ is the length of the cyclic prefix in number of samples.

Multi-carrier OFDM/QAM modulation is well known and used in numerous digital communication systems (ADSL, WiFi, etc.) and in digital broadcast systems (DAB, DVB-T, DRM, etc.).

Adding a cyclic prefix (or a guard interval) of length $L_{CP}$ greater than the maximum length of the channel makes it easier to equalize the channel by avoiding problems of ISI interference, but it leads to a loss of spectrum efficiency, which is particularly great when the cyclic prefix (or the guard interval) is long. Specifically, the cyclic prefix or the guard interval that is introduced does not carry useful information in order to guarantee that the information received and processed on reception does indeed come from a single multi-carrier symbol.

In order to mitigate that drawback, it is known to use modulation of the orthogonal frequency division multiplex/offset quadrature amplitude modulation (OFDM/OQAM) type. This modulation decomposes a complex QAM symbol $c_{m,n}$ into a pair of real symbols constituted by the real portion $R(c_{m,n})$ and by the imaginary portion $I(c_{m,n})$ of the complex symbol $c_{m,n}$, occupying two symbol half-times.

The real and imaginary portions $R(c_{m,n})$ and $I(c_{m,n})$ of a complex symbol for transmitting are mapped onto a common subcarrier m of two multi-carrier symbols offset by a symbol half-time. OQAM coding amounts to transmitting the real and imaginary portions of QAM constellations separately by offsetting them in time. This decomposition into real symbols makes it possible to relax the orthogonality constraint imposed on the system to the field of real numbers only, thereby making it easier to design orthogonal functions for shaping the multi-carrier signal (also known as prototype functions or filters) that are well localized in frequency and in time, and providing degrees of freedom for constructing a signal that is both well localized in time and well localized in frequency. This property makes it possible to omit inserting a cyclic prefix (CP-OFDM), which has the function of prolonging a multi-carrier symbol and which has the drawback of consuming bandwidth.

The OFDM/OQAM signal in discrete form, in baseband, for a normalized sampling frequency equal to one, and for M carriers, may be expressed in the following form:

$$s[k] = \sum_{m=0}^{M-1} \sum_{n \in Z} a_{m,n} g[k-nN] e^{j\frac{2\pi}{M}m(k-\frac{D}{2})} e^{j\phi_{m,n}}, \quad (1)$$

in which expression g[k] is the prototype filter of length L with D=L−1, k=0, . . . , M−1.

As in most devices of this type, the filter is assumed to be symmetrical and to have values that are real. N=M/2 is the offset in discrete time between two OQAM symbols, $\phi_{m,n}$ is the additional phase term for the subcarrier of index m and for the OQAM symbol of index n, which phase may be expressed in the form $$\frac{\pi}{2}(n+m).$$

The signal transports the symbols $a_{m,n}$ that have values that are real and correspond to the real and to the imaginary portions of points of the QAM constellation onto which the generally coded data for transmission from a source signal was mapped.

Compared with reference OFDM/QAM multi-carrier modulation, an advantage of OFDM/OQAM is thus associated with its spectral properties. Since it has a power spectrum density that is more compact, OFDM/OQAM is easier to insert in the frequency bands that are available, and this is particularly advantageous given that spectrum is a resource that is scarce, and usually made available by licensing in return for significant financial consideration.

More generally, the multi-carrier signal involved in the context of the invention has the special feature that the data symbols mapped onto the subcarriers are transmitted with a time offset equal to half the multi-carrier symbol duration. The OFDM/OQAM multi-carrier signal, sometimes referred to as a filter bank multi-carrier/OQAM (FBMC/OQAM) signal, is an example of such a signal.

The transmitted data coming from a source signal is formatted in the form of multi-carrier symbols inserted in frames. A frame generally begins with one or more preambles.

For OFDM/OQAM modulation, the preamble may be expressed in the following form:

$$P[k] = \sum_{m=0}^{M-1} \sum_{n=0}^{1} p_{m,n} g[k - nN] e^{j\frac{2\pi}{M}m(k-\frac{D}{2})} e^{j\phi_{m,n}}, \quad (2)$$

in which expression, the pilot symbols $p_{m,n}$ are mapped on the $m^{th}$ subcarrier of the $n^{th}$ slot. Since the preamble is assumed to be transmitted at the beginning of the frame on the first two slots: n=0 and n=1; the pilots are determined for these two slots.

The invention lies more particularly in the context of transmission in bursts, as for Wi-Fi. Time synchronization is achieved on the basis of a symbol preamble placed at the beginning of the burst, or else repetitively by inserting a preamble at the beginning of each transmission frame. Depending on the application, a burst may contain one or more frames satisfying various criteria: quality of service (QoS), data rate, latency, etc. . .

This type of transmission is important for so-called machine to machine (M2M) transmissions, which are naturally sporadic in character. For this type of transmission, synchronization is of great importance since any retransmission of a frame can be expensive in terms of energy expenditure. By way of example, this type of transmission covers transmissions between arrays of sensors, between arrays of meters.

PRIOR ART

Conventionally, the receiver calculates the autocorrelation of the received signal in the absence of knowledge of the preamble, and it detects the beginning of the frame if the result of the autocorrelation crosses a determined decision threshold in the absence of knowledge of the instant of arrival of the transmitted samples.

Fusco et al [1] describes a method of synchronizing an OFDM/OQAM signal. In OFDM/OQAM, the preamble P[k] is constructed with a first multi-carrier symbol and a second multi-carrier symbol that is offset by one symbol half-time. The authors propose transmitting non-zero pilot symbols of value $\sqrt{2}$ only on subcarriers of even index during the first symbol (slot) of OQAM symbols, and not modulating the second slot, i.e. transmitting only zero values for the second symbol:

$$p_{m,0} = \begin{cases} \sqrt{2}, & m \text{ even} \\ 0, & m \text{ odd} \end{cases} \quad (3)$$

and $$p_{m,1} = \begin{cases} 0, & m \text{ even} \\ 0, & m \text{ odd} \end{cases} \quad (4)$$

This preamble P[k] as constructed in this way by the modulator possesses the following Hermitian symmetry:

$$P[N-1-k] = P^*[N+k], \quad (5)$$

for k=0, . . . , N−1, where * is a conjugate operator.

The receiver can take advantage of the symmetry property for synchronization purposes. Synchronization is performed by the receiver calculating the following metric:

$$R(d) = \sum_{k=0}^{N-1} r[N-1-k+d]r[N+k+d], \quad (6)$$

on the basis of the received samples r[k]. The receiver determines the synchronization instant when the power of the metric exceeds a threshold.

Nevertheless, the symmetry property has a chance of being preserved on reception only if the channel is a channel of the additive noise type, e.g. a channel that adds white Gaussian noise (AWGN), which excludes multi-path channels. Thus, during transmission over a multi-path channel, the peak value detected by the synchronization module suffers a reduction in its energy, which gives rise to a higher probability of a false alarm and/or of non-detection. Unfortunately, when transmitting in bursts, the probability of nondetection is of extreme importance, since it involves complying with QoS or latency constraints.

Dandach et al. [2] proposes a synchronization method that uses a preamble structure that is the same as that of Fusco [1]. The synchronization metric has the following expression:

$$R(d) = \sum_{k=0}^{N/2-1} g[k]g[N-1-k]r[k+d]r[N-1-k+d] \quad (7)$$

The synchronization metric takes account of the form of the prototype filter, which can create an additional symmetry property for the received symbol and reduce the complexity of Fusco [1]. However, this property can apply only with transmission that is ideal, e.g. over a Gaussian channel. Also, given that the coefficients of the filter do not have values that are uniform (constant), the metric calculated from low-value coefficients is sensitive to noise, and that increases the variance of the estimation noise.

There thus exists a need for a synchronization method that is of better performance when transmitting over a multi-path channel.

SUMMARY OF THE INVENTION

The invention proposes a method of transmitting a signal comprising successive multi-carrier symbols with M subcarriers arranged in a frame. The frame is delimited by a preamble comprising a first multi-carrier symbol $P_0[k]$. The method comprises constructing multi-carrier symbols involving mapping data symbols for transmission on the subcarriers, with $$P_0[k] = \sum_{m=0}^{M-1} p_{m,0} g[k] e^{j\frac{2\pi}{M}m(k-\frac{D}{2})} e^{j\frac{\pi m}{2}}$$

in which expression g[k] is a prototype filter of length D+1, $p_{m,0}$ are pilot symbols mapped on the $m^{th}$ subcarrier of the first symbol of time index n=0, and N=M/2 is the time offset prior to constructing the multi-carrier symbols between two successive data symbols mapped onto a subcarrier of the same index. The preamble further comprises a second multi-carrier symbol $P_1[k]$ such that:

$$P_1[k] = \sum_{m=0}^{M-1} p_{m,1} g[\mathrm{mod}(k-N, M)] e^{j\frac{2\pi}{M}m(k-\frac{D}{2})} e^{j\frac{\pi(m+1)}{2}}$$

and the pilot symbols are such that:

$$p_{m,0} = \begin{cases} \alpha_m, & m \text{ even} \\ 0, & m \text{ odd} \end{cases} \text{ and } p_{m,1} = \begin{cases} p_{m,0}(-j), & m \text{ even} \\ 0, & m \text{ odd} \end{cases}$$

with $\alpha_m$ a real random variable.

The invention also provides a transmitter for transmitting a signal comprising successive multi-carrier symbols with M subcarriers arranged in a frame. The frame is delimited by a preamble comprising a first multi-carrier symbol $P_0[k]$. The transmitter comprises means for constructing multi-carrier symbols involving mapping data symbols for transmission on the subcarriers, with $$P_0[k] = \sum_{m=0}^{M-1} p_{m,0} g[k] e^{j\frac{2\pi}{M}m(k-\frac{D}{2})} e^{j\frac{\pi m}{2}}$$

in which expression g[k] is a prototype filter of length D+1, $p_{m,0}$ are pilot symbols mapped on the $m^{th}$ subcarrier of the first symbol of time index n=0, and N=M/2 is the time offset prior to constructing the multi-carrier symbols between two successive data symbols mapped onto a subcarrier of the same index. The transmitter comprises a module for determining a second multi-carrier symbol $P_1[k]$ forming part of the preamble and having the following expression:

$$P_1[k] = \sum_{m=0}^{M-1} p_{m,1} g[\mathrm{mod}(k-N, M)] e^{j\frac{2\pi}{M}m(k-\frac{D}{2})} e^{j\frac{\pi(m+1)}{2}}$$

and for determining pilot symbols such that $$p_{m,0} = \begin{cases} \alpha_m, & m \text{ even} \\ 0, & m \text{ odd} \end{cases} \text{ and } p_{m,1} = \begin{cases} p_{m,0}(-j), & m \text{ even} \\ 0, & m \text{ odd} \end{cases}$$

with $\alpha_m$ a real random variable.

Such a transmitter is suitable in particular for performing the transmission method of the invention.

The invention also provides a signal transmitted between a transmitter and a receiver, and comprising successive multi-carrier symbols with M subcarriers arranged in a frame. The frame is delimited by a preamble comprising a first multi-carrier symbol $P_0[k]$. The multi-carrier symbols come from a construction involving mapping data symbols for transmission on the subcarriers, with:

$$P_0[k] = \sum_{m=0}^{M-1} p_{m,0} g[k] e^{j\frac{2\pi}{M}m(k-\frac{D}{2})} e^{j\frac{\pi m}{2}}$$

in which expression g[k] is a prototype filter of length D+1, $p_{m,0}$ are pilot symbols mapped on the $m^{th}$ subcarrier of the first symbol of time index n=0, and N=M/2 is the time offset prior to constructing the multi-carrier symbols between two successive data symbols mapped onto a subcarrier of the same index. The preamble further comprises a second multi-carrier symbol having the following expression:

$$P_1[k] = \sum_{m=0}^{M-1} p_{m,1} g[\mathrm{mod}(k-N, M)] e^{j\frac{2\pi}{M}m(k-\frac{D}{2})} e^{j\frac{\pi(m+1)}{2}}$$

and the pilot symbols are such that:

$$p_{m,0} = \begin{cases} \alpha_m, & m \text{ even} \\ 0, & m \text{ odd} \end{cases} \text{ and } p_{m,1} = \begin{cases} p_{m,0}(-j), & m \text{ even} \\ 0, & m \text{ odd} \end{cases}$$

with $\alpha_m$ a real random variable.

The invention also provides a method of synchronizing a receiver receiving a signal comprising successive multi-carrier symbols with M subcarriers arranged in a frame, the frame being delimited by a preamble, and the multi-carrier symbols coming from a construction involving mapping data symbols for transmission on the subcarriers such that N=M/2 is the time offset before constructing the multi-carrier symbols between two successive data symbols mapped on a subcarrier of the same index. The method comprises:

calculating a "coarse" synchronization metric at successive instants d corresponding respectively to received samples r[k] of the transmitted signal:

$$R_c(d) = \sum_{k=0}^{N-1} r[k+d] r^*[N+k+d];$$

where * is a conjugate operator; and detecting the coarse metric crossing a determined threshold, which crossing corresponds to a "coarse" synchronization instant ds.

The invention also provides a receiver of a signal comprising successive multi-carrier symbols with M subcarriers arranged in a frame, the frame being delimited by a preamble, and the multi-carrier symbols coming from a construction involving mapping data symbols for transmission on the subcarriers such that N=M/2 is the time offset before constructing the multi-carrier symbols between two successive data symbols mapped on a subcarrier of the same index. The receiver comprises:

a computer for calculating a "coarse" synchronization metric at successive instants d corresponding respectively to received samples r[k] of the transmitted signal:

$$R_c(d) = \sum_{k=0}^{N-1} r[k+d]r^*[N+k+d];$$

where * is a conjugate operator; and means for detecting the coarse metric crossing a determined threshold, which crossing corresponds to a "coarse" synchronization instant ds.

Such a receiver is suitable in particular for performing the synchronization method of the invention.

The invention relies on transmitting multi-carrier symbols arranged in a frame being delimited by a preamble that possesses the property of Hermitian symmetry and also the following property:

$$P[k]=P[N+k], \quad (8)$$

for k=0, ..., N−1. This latter property is particularly important since it enables the metric to be calculated recursively, which is not true of the metric of Fusco et al [1] nor of the metric of Dandach [2]. This property make it possible to reduce the complexity of calculation very considerably. The resulting complexity for calculating the normalized metric of the invention is evaluated at four complex multiplications, four complex additions, and one complex division for each value of d after calculating the first value of d, whereas the metric of Fusco et al [1] expressed in normalized form:

$$M(d) = \frac{|R(d)|^2}{D(d)^2} \text{ with } D(d) = \sum_{k=0}^{N-1} |r[N-1-k+d]|^2 \quad (9)$$

leads to a resulting complexity of 2N complex multiplications, N−1 complex additions, and a complex division, while the metric of Dandach et al [2] expressed in normalized form:

$$M(d) = \frac{|R(d)|^2}{D(d)^2} \text{ with } D(d) = \sum_{k=0}^{N/2-1} |g[N-1-k]r[k+d]|^2 \quad (10)$$

leads to a resulting complexity of 3N/2 complex multiplications, N/2−1 complex additions, and one complex division.

For example, when taking the IEEE 802.11ac standard for which the sampling frequency is 20 megahertz (MHz), the receiver needs to act for each value of d, i.e. once every 50 nanoseconds (ns), to perform of the above-listed operations: four multiplications, four complex additions, and one complex division for the normalized metric of the invention in comparison with 2N complex multiplications, N−1 complex additions, and one complex division for the normalized metric of Fusco [1], and 2N complex multiplications, N−1 complex additions, and one complex division for the normalized metric of Dandach [2]. For the 3GPP LTE standard release 8 et seq., for which the sampling frequency is 30.72 MHz, the above calculations need to be performed about once every 32 ns.

Such a reduction in complexity with a preamble of the invention is most particularly advantageous for M2M applications that rely on devices with highly constricted energy consumption and thus with very limited computation power.

Property (8) is preserved even after transmission in a multi-path channel, thus making it possible to improve synchronization compared with the prior art, while taking advantage of the reduction in complexity to increase the accuracy of calculation and consequently to reduce the false alarm rate and/or the nondetection rate.

In a particular implementation, the multi-carrier symbols are of the OFDM/OQAM type.

In a particular embodiment, the transmitter comprises an OFDM/OQAM modulator and the preamble is then constituted by two OFDM/OQAM symbols, for example.

A transmitter of the invention may have various characteristics relating to the transmission method of the invention, which may be combined or taken in isolation. Thus, the characteristics and advantages of the transmitter are the same as those of the transmission method.

A receiver of the invention may comprise various characteristics relating to the synchronization method of the invention, which may be combined or taken in isolation. Thus, the characteristics and advantages of the receiver are the same as those of the synchronization method.

LIST OF FIGURES

Other characteristics and advantages of the invention appear more clearly on reading the following description of particular implementations given merely as illustrative and nonlimiting examples, and from the accompanying drawings, in which.

DETAILED DESCRIPTION OF IMPLEMENTATIONS

Figure 1:
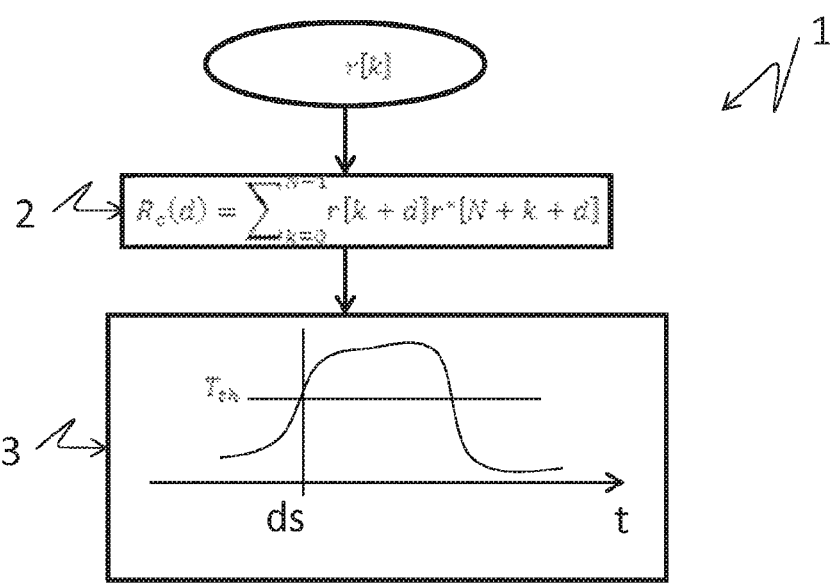
FIG. 1 shows the running of the synchronization method of the invention in a particular implementation.

The invention applies in particular to an OFDM/OQAM signal that can be expressed in the form (1). More generally, the invention applies to a signal comprising successive multi-carrier symbols with M subcarriers coming from a construction involving mapping data symbols for transmission on the subcarriers such that N=M/2 is the time offset before construction of the multi-carrier symbols between two successive data symbols mapped onto a subcarrier having the same index.

The general principle of the invention relies on using a preamble of particular structure that is generally inserted at the beginning of a frame. The preamble is expressed as follows:

$$P[k]=P_0[k]+P_1[k] \quad (11)$$

with:

$$P_0[k] = \sum_{m=0}^{M-1} P_{m,0} g[k] e^{j\frac{2\pi}{M}m(k-\frac{D}{2})} e^{j\frac{\pi m}{2}} \quad (12)$$

and $$P_1[k] = \sum_{m=0}^{M-1} P_{m,1} g[\mathrm{mod}(k-N, M)] e^{j\frac{2\pi}{M}m(k-\frac{D}{2})} e^{j\frac{\pi(m+1)}{2}} \quad (13)$$

in which expressions g[k] is a prototype filter of length D+1 and the pilot symbols $p_{m,n}$ are such that:

$$p_{m,0} = \begin{cases} \alpha_m, & m \text{ even} \\ 0, & m \text{ odd} \end{cases} \text{ and } p_{m,1} = \begin{cases} p_{m,0}(-j), & m \text{ even} \\ 0, & m \text{ odd} \end{cases} \quad (14)$$

with $\alpha_m$ a real random variable.

Introducing circular filtering into the modulation of the second symbol makes it possible to create the symmetry property in accordance with expression (8). The random nature of $\alpha_m$ makes it possible to ensure a low level for the peak to average power ratio (PAPR).

The pilots are mapped on the $m^{th}$ subcarrier of the $n^{th}$ slot. Since the preamble is assumed to be transmitted at the beginning of the frame on the first two symbol times (slots): n=0 and n=1, the pilots are determined for these two symbol times (slots).

A transmitter of the invention transmits a signal that corresponds to successive symbols arranged in a frame in such a manner that the beginning of the frame is delimited by a preamble of special structure as described above. A transmission method of the invention transmits a signal that corresponds to successive samples arranged in a frame in such a manner that the beginning of the frame is defined by a preamble of special structure as described above.

A receiver of the invention receiving the transmitted signal calculates at least one metric that makes use of the above-described preamble of special structure.

In a first implementation of synchronization in the receiver, the invention makes use of a single metric, and the synchronization is said to be coarse. This first metric calculates a correlation between successive received symbol sequences delimited by a moving window. The metric presents a peak when the window is in register with the preamble since the two symbols are strongly correlated.

Distortion in the transmitted signal due to the channel or to the receiver itself (noise) can modify the symbols and can introduce bias concerning the correlation between the symbols.

In a second implementation of synchronization in the receiver, the invention uses two metrics, the coarse metric and a second metric that makes so-called "fine" synchronization possible. The second metric is identical to the preceding metric and it measures correlation on a moving window of received samples, but of smaller size around the coarse synchronization instant.

The synchronization method in a particular implementation is described below and shown in FIG. 1. r(k) is the sampled received signal. The received signal corresponds to the transmitted signal together with any distortion due to the channel and/or to noise.

The synchronization method 1 calculates the coarse synchronization metric for the samples r(k) received at successive instants d. Calculation 2 of the "coarse" synchronization metric amounts to summing the correlations between two sequences of N received samples, and it has the following expression:

$$R_c(d) = \sum_{k=0}^{N-1} r[k+d] r^*[N+k+d], \quad (15)$$

where $(.)^*$ is the conjugate operator.

This first metric is a measurement of the correlation between successive sequences of N received samples. Without the impact of the channel and of noise, its value is a maximum when the successive sequences delimited by a moving window of length M=2N correspond to the preamble (11). Specifically, its expression is based on the correlation that exists within the preamble between firstly the N samples of the first symbol and secondly the N samples of the second symbol.

In a particularly advantageous implementation, the method calculates the metric in its normalized form.

The summing that appears in the expression for the metric can be calculated recursively. In other words, the value of the sum at an instant (d+1) may be calculated from its value at the instant (d), thereby reducing the complexity of the synchronization method and of the receiver.

Specifically, at the instant (d+1), the value of the metric is equal to:

$$R_c(d+1) = \sum_{k=0}^{N-1} r[k+d+1] r^*[N+k+d+1] \quad (16)$$
$$= R_c(d) + r[d+N] r^*[d+2N] - r[d] r^*[d+N]$$

Thus, instead of performing N complex additions and N complex multiplications at each instant d in order to calculate the metric, only two complex multiplications and only two additions are required with a recursive calculation, thereby greatly reducing the complexity of the receiver.

Likewise for calculating the normalized metric:

$$M_c(d+1) = \frac{|R_c(d+1)|^2}{D_c(d+1)^2} \text{ with } D_c(d+1) = \sum_{k=0}^{N-1} |r[k+d+1]|^2 \quad (17)$$

$$D_c(d+1) = \sum_{k=0}^{N-1} r[k+d+1] r^*[k+d+1] \quad (18)$$
$$= D_c(d) + r[d+N] r^*[d+N] - r[d] r^*[d]$$

The method determines a synchronization instant ds that is said to be coarse when the metric exceeds a determined threshold, which amounts to detecting the presence of the received signal. The metric is compared with the determined threshold $T_{th}$. The value of this threshold is determined depending on the probability of packet loss. In general, a packet corresponds to a frame delimited by one or more preambles followed by data, known as "payload". For example, with an SNR of 0 dB, the determined value of the threshold is 0.8 for a packet loss probability of 4% (where "loss" designates non-detection for all of the packets sent).

During the comparison, the synchronization method detects when the threshold $T_{th}$ is crossed. The crossing corresponds to an instant ds referred to as the "coarse" synchronization instant.

The synchronization method of the invention is simple, with the operations to be performed being either operations of addition or operations of multiplication, and with this being performed on a limited number of samples.

Depending on the implementation, the synchronization method may improve the measurement of correlation between successive received sequences of samples by means of a second metric that is identical to the first metric, but that is calculated over a number of samples that may be smaller and taken from a window in register with the coarse synchronization instant in order to refine the previously determined synchronization instant ds.

In this implementation, the synchronization method calculates the synchronization metric at instants d contained in a search window W of determined size Δ, beginning with an instant close to ds: W=[ds, . . . , ds+Δ−1]. The method determines the size Δ of the window W as a function of the probability that the beginning of the frame is to be found in the window. The greater the size Δ the more the probability approaches 1. The maximum value of the second metric corresponds to the estimated start $\hat{d}$ of the preamble, and thus of the received frame.

Figure 2A:
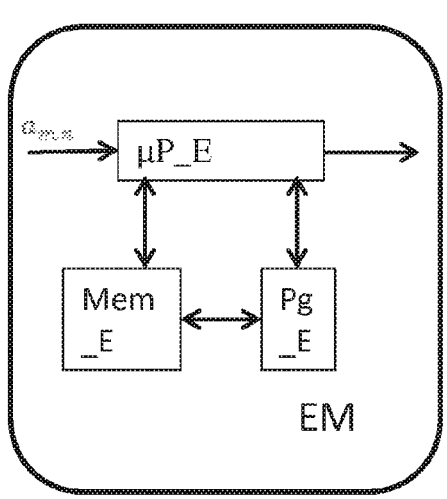
FIG. 2a is a simplified structural diagram of a transmitter performing a transmission method of the invention.

A simplified structure for a transmitter performing a transmission method in accordance with the above described implementations is described below and shown in FIG. 2a.

Such a transmitter EM comprises a memory Mem_E including a buffer memory, a processor unit μP_E, e.g. having a microprocessor and controlled by a computer program Pg_E performing the signal transmission method of the invention.

On initialization, the code instructions of the computer program Pg_E are for example loaded into a random access memory RAM prior to being executed by the processor of the processor unit μP_E. As input, the processor unit μP_E receives data, e.g. modulated in the form of symbols $a_{m,n}$. The microprocessor of the processor unit μP_E performs the above-described transmission method, in compliance with the instructions of the computer program Pg_E. To do this, the transmitter includes means for determining the preamble P[k] corresponding to the relationships (11), (12), and (13). These means are controlled by the microprocessor and form part of the processor unit μP_E.

Figure 2B:
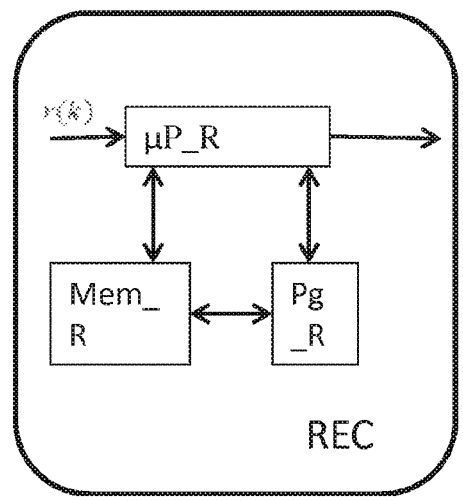
FIG. 2b is a simplified structural diagram of a receiver performing a synchronization method of the invention.

A simplified structure for a receiver performing a synchronization method in accordance with the above described implementations is described below and shown in FIG. 2b.

Such a receiver REC comprises a memory Mem_R including a buffer memory, a processor unit μP_R, e.g. provided with a microprocessor and controlled by a computer program Pg_R performing the synchronization method of the invention.

On initialization, the code instructions of the computer program Pg_R are loaded for example into a random access memory RAM prior to being executed by the processor of the processor unit μP_R. As input, the processor unit μP_R receives the samples r(k) of the signal transmitted via a channel (e.g. in a single band or in a plurality of bands, for example) that may be dispersive (or a multipath channel, e.g. a radio channel). The microprocessor of the processor unit μP_R performs the above-described synchronization method, in compliance with the instructions of the computer program Pg_R. To do this, the receiver comprises a computer for calculating the coarse synchronization metric at successive instants d corresponding to respective received samples and also means for detecting when the coarse metric crosses a determined threshold, which crossing corresponds to an instant ds referred to as a "coarse" synchronization instant of the receiver. The receiver may also include means for determining a fine search window W on the basis of the coarse synchronization value ds, a computer for calculating the fine synchronization metric at successive instants d contained in the fine search window W, and means for detecting the maximum of the fine metric or when the fine metric crosses a determined threshold, which maximum or threshold corresponds to a fine synchronization instant. These means are controlled by the microprocessor and form part of the processor unit μP_R.

Simulations have enabled the synchronization method of the invention to be compared with two prior art techniques, the technique of Fusco [1] and the technique of Dandach [2]. The simulations were performed using the following parameters: FFT size equal to 64, prototype filter length L equal to M, calculating the factor $\alpha_m$ in such a manner that the power of the generated preamble is the same for all three methods, a first Gaussian channel model (AWGN) and a second multipath channel (MP) having two paths introducing a delay equal to 25% of the multi-carrier symbol duration, with gain for the second path 20% less than the gain of the first (main) path.

Figure 3:
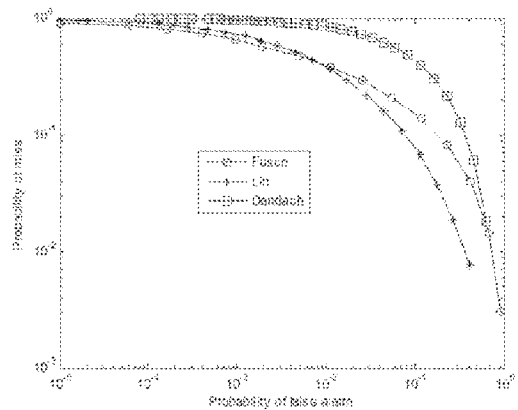
FIGS. 3 and 4 show probability curves of poor detection as a function of the probability of a false alarm for two prior art methods and for a method of the invention for a Gaussian channel (AWGN) with respective signal to noise ratios (SNRs) of 0 decibels (dB) and of 5 dB.
Figure 4:
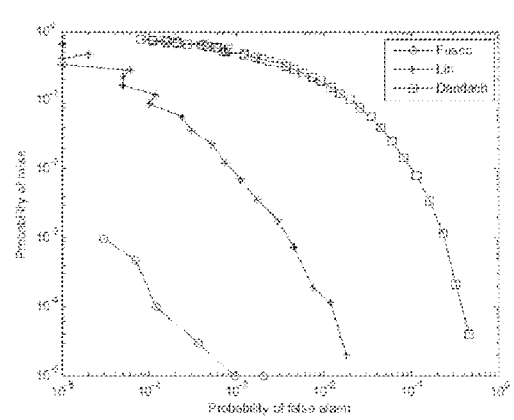
Figure 5:
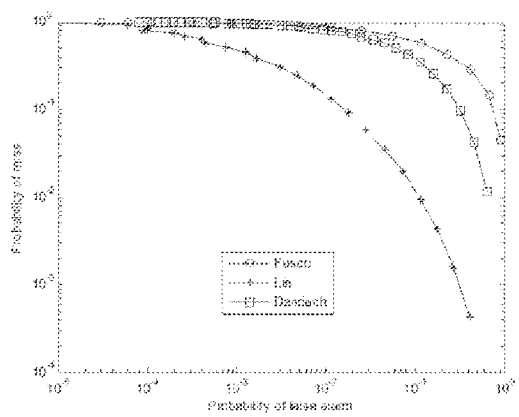
FIGS. 5 and 6 show probability curves of poor detection as a function of the probability of a false alarm for the two prior art methods and for a method of the invention for a multipath (MP) channel with respective SNRs of 0 dB and 5 dB
Figure 6:
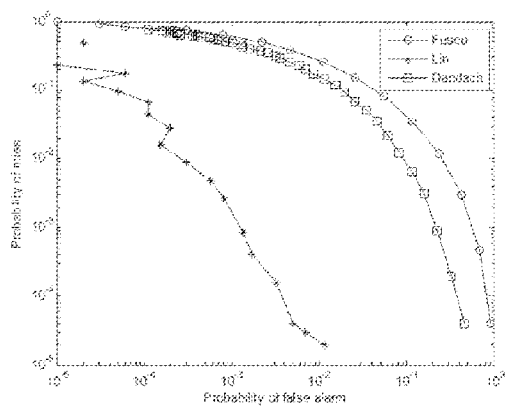

FIGS. 3 to 6 show the probability of poor detection as a function of the false alarm probability for the two prior art methods, the method of Fusco [1] and the method of Dandach [2], and for a method of the invention Lin. FIG. 3 corresponds to an SNR of 0 dB and to a Gaussian transmission channel (AWGN). FIG. 4 corresponds to an SNR of 5 dB and to a Gaussian transmission channel (AWGN). FIG. 5 corresponds to an SNR of 0 dB and to a multipath transmission channel (MP). FIG. 6 corresponds to an SNR of 5 dB and to a multipath transmission channel (MP).

Comparing the curves shows that the probabilities of poor detection and of false alarms improve with increasing SNR for a Gaussian channel or a multipath channel regardless of the method, which is entirely normal.

For the Gaussian channel, when the SNR increases, best performances observed with the method of Fusco [1], as shown in FIG. 4 compared with FIG. 3. This is explained by the fact that the Hermitian symmetry property (5) is exactly true. For the method of Dandach [2], introducing coefficients of the prototype filter into expression (7) of the metric leads to an estimator that is unstable when the noise power becomes non-negligible, as shown in FIGS. 3 and 4; the Dandach curve is less good than the other two curves.

For a multipath channel, which corresponds to conditions of use that are more realistic than a Gaussian channel, the best performance is obtained with the method of the invention. Specifically, the property (8) remains valid while the Hermitian symmetry property (5) is no longer exactly true and thus leads to a smaller power for the peak of the metric (6); the method of Fusco [1] does not enable the same performance to be maintained as with the Gaussian channel. The method of the invention thus leads to synchronization that is better in terms of the probability of nondetection and the probability of a false alarm.

Figure 7:
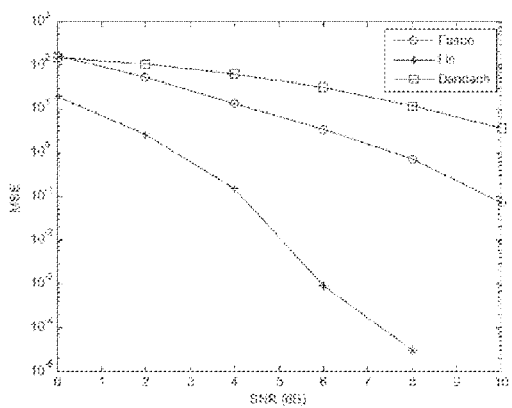
FIG. 7 shows least mean square errors (MSE) for estimating the delay ds for the two prior art methods and for a method of the invention.

FIG. 7 shows the error in terms of the mean square error (MSE) for the estimate of the synchronization delay $\hat{d}$ for each of the three methods. The MSE is calculated using the expression:

$$MSE(d) = \frac{1}{N_r} \sum_{i=0}^{N_r-1} (d - \hat{d}_i)^2, \quad (19)$$

where $N_r$ is the number of times the simulation is iterated and where $\hat{d}_i$ is the estimated synchronization delay at the $i^{th}$ iteration of the simulation.

Comparing the three curves shows that the method of the invention leads to synchronization that is more accurate, since for given SNR, the MSE is the smallest with the curve Lin.

[1] T. Fusco, A. Petrella, and M. Tanda, "A data-aided symbol timing estimation algorithm for OFDM/OQAM systems," in Proc. Intern. Conf. on Communications (ICC), Dresden, Germany, 2009, pp. 1-5.
[2] Y. Dandach and P. Siohan, "Procédé de réception d'un signal multiporteuse de type OQAM, dispositif de réception et program d'ordinateur correspondants" [A method of receiving an OQAM type multi-carrier signal, and a corresponding receiver device and computer program] PCT application FR2012/051497, filed on Jun. 28, 2012.

The invention claimed is:

1. A method comprising:
constructing multi-carrier symbols involving mapping data symbols for transmission on M subcarriers, and constructing a preamble comprising a first multi-carrier symbol $P_0[k]$, wherein $$P_0[k] = \sum_{m=0}^{M-1} p_{m,0} g[k] e^{j\frac{2\pi}{M}m\left(k-\frac{D}{2}\right)} e^{j\frac{\pi m}{2}}$$

in which expression $g[k]$ is a prototype filter of length $D+1$, $p_{m,0}$ are pilot symbols mapped on the $m^{th}$ subcarrier of the first symbol of time index $n=0$, $k$ is a sample index, and $N=M/2$ is the time offset prior to constructing the multi-carrier symbols between two successive data symbols mapped onto a subcarrier of the same index, wherein the preamble further comprises a second multi-carrier symbol having the following expression:

$$P_1[k] = \sum_{m=0}^{M-1} p_{m,1} g[\mathrm{mod}(k-N, M)] e^{j\frac{2\pi}{M}m\left(k-\frac{D}{2}\right)} e^{j\frac{\pi(m+1)}{2}}$$

and wherein the pilot symbols are such that $$p_{m,0} = \left\{\begin{array}{l}\alpha_m, m \text{ even} \\ 0, m \text{ odd}\end{array}\right\} \text{ and } p_{m,1} = \left\{\begin{array}{l}p_{m,0}(-j), m \text{ even} \\ 0, m \text{ odd}\end{array}\right\}$$

with $\alpha_m$ being a real random variable; and
transmitting a signal comprising the preamble and the multi-carrier symbols in succession arranged in a frame.

2. The method of claim 1, wherein the multi-carrier symbols are of the OFDM/OQAM type.

3. A transmitter (EM) for transmitting a signal comprising successive multi-carrier symbols with M subcarriers arranged in a frame with a preamble comprising a first multi-carrier symbol $P_0[k]$, the transmitter comprising:
a module for constructing multi-carrier symbols involving mapping data symbols for transmission on the subcarriers, wherein $$P_0[k] = \sum_{m=0}^{M-1} p_{m,0} g[k] e^{j\frac{2\pi}{M}m\left(k-\frac{D}{2}\right)} e^{j\frac{\pi m}{2}}$$

in which expression $g[k]$ is a prototype filter of length $D+1$, $p_{m,0}$ are pilot symbols mapped on the $m^{th}$ subcarrier of the first symbol of time index $n=0$, $k$ is a sample index, and $N=M/2$ is the time offset prior to constructing the multi-carrier symbols between two successive data symbols mapped onto a subcarrier of the same index; and
a module for determining a second multi-carrier symbol $P_1[k]$ forming part of the preamble and having the following expression:

$$P_1[k] = \sum_{m=0}^{M-1} p_{m,1} g[\mathrm{mod}(k-N, M)] e^{j\frac{2\pi}{M}m\left(k-\frac{D}{2}\right)} e^{j\frac{\pi(m+1)}{2}}$$

and for determining pilot symbols such that $$p_{m,0} = \left\{\begin{array}{l}\alpha_m, m \text{ even} \\ 0, m \text{ odd}\end{array}\right\} \text{ and } p_{m,1} = \left\{\begin{array}{l}p_{m,0}(-j), m \text{ even} \\ 0, m \text{ odd}\end{array}\right\}$$

with $\alpha_m$ being a real random variable.

4. A system comprising:
a transmitter constructing and transmitting a signal;
a receiver receiving the signal;
wherein the signal comprises successive multi-carrier symbols with M subcarriers arranged in a frame with a preamble comprising a first multi-carrier symbol $P_0[k]$, the multi-carrier symbols coming from the construction involving mapping data symbols for transmission on the subcarriers, with $$P_0[k] = \sum_{m=0}^{M-1} p_{m,0} g[k] e^{j\frac{2\pi}{M}m\left(k-\frac{D}{2}\right)} e^{j\frac{\pi m}{2}}$$

in which expression $g[k]$ is a prototype filter of length $D+1$, $p_{m,0}$ are pilot symbols mapped on the $m^{th}$ subcarrier of the first symbol of time index $n=0$, $k$ is a sample index, and $N=M/2$ is the time offset prior to constructing the multi-carrier symbols between two successive data symbols mapped onto a subcarrier of the same index, wherein the preamble further comprises a second multi-carrier symbol having the following expression:

$$P_1[k] = \sum_{m=0}^{M-1} p_{m,1} g[\mathrm{mod}(k-N, M)] e^{j\frac{2\pi}{M}m\left(k-\frac{D}{2}\right)} e^{j\frac{\pi(m+1)}{2}}$$

and wherein the pilot symbols are such that $$p_{m,0} = \left\{\begin{array}{l}\alpha_m, m \text{ even} \\ 0, m \text{ odd}\end{array}\right\} \text{ and } p_{m,1} = \left\{\begin{array}{l}p_{m,0}(-j), m \text{ even} \\ 0, m \text{ odd}\end{array}\right\}$$

with $\alpha_m$ being a real random variable.

* * * * *